United States Patent [19]

Yamada

[11] Patent Number: 4,564,865
[45] Date of Patent: Jan. 14, 1986

[54] PICTURE SCANNING AND RECORDING METHOD

[75] Inventor: Mitsuhiko Yamada, Kyoto, Japan

[73] Assignee: Dainippon Screen Mfg. Co., Ltd., Japan

[21] Appl. No.: 493,414

[22] Filed: May 10, 1983

[30] Foreign Application Priority Data

May 24, 1982 [JP] Japan .................................. 57-88355

[51] Int. Cl.⁴ .............................................. H04N 1/04
[52] U.S. Cl. ...................................... 358/287; 382/47
[58] Field of Search .......................... 358/287; 382/47

[56] References Cited

U.S. PATENT DOCUMENTS 4,282,550 8/1981 Coviello .............................. 358/287
4,305,093 12/1981 Nasis ................................... 358/287

FOREIGN PATENT DOCUMENTS 1537328 12/1978 United Kingdom .

Primary Examiner—Edward L. Coles, Sr.
Attorney, Agent, or Firm—Brumbaugh, Graves, Donohue & Raymond

[57] ABSTRACT

An original picture is photoelectrically scanned to produce image signals that are written on addresses of a memory at intervals corresponding to a magnification ratio. Each of the thus skipped over addresses are subsequently filled up with the image signal written on the leading address. Blank addresses adjacent to and interposed between the addresses allocated zigzag to contour lines of a figure in the picture are complemented with the image signals stored on the zigzag addresses near to the blank addresses. The originally written signals, filled up signals as well as complemented signals are then read to control a recording device.

2 Claims, 7 Drawing Figures

PICTURE SCANNING AND RECORDING METHOD

BACKGROUND OF THE INVENTION

The invention relates to a method for photoelectrically scanning an original picture to thereby record a duplicate image thereof wherein a TV camera or a solid-state image sensor is used to produce image signals of the picture, the signals being properly processed for recording a so-called "binary" image of characters or the like.

Generally, image signals of a character copy are digitized at first in order to be written into a memory and are then processed into digital recording signals. In case where the sizes of said characters or letters are small, the copy is usually scanned in such a manner as to give an enlarged image of suitable magnification. This will sometimes prevent the TV camera from catching the whole copy within its range of vision. Divisional photographing or image-sensing processes will therefore be required for magnifying the copy so that such divisional images can be composed on a cathode ray tube (CRT) display. Such a processing manner is however disadvantageous in that it needs a memory of large capacity as well as an intricate operation for composing of the divisional images.

SUMMARY OF THE INVENTION

The invention aims to solve the disadvantages in the known method.

An object of the invention is therefore to provide a method which is adapted to magnify a characters copy in an original picture without optically magnifying same relative to graphic portions of said picture in a photoelectric scanning system.

Another object of the invention is to provide a data processing method which enables a selection of any arbitrary ratio of magnification of a characters or binary copy, on one hand, as well as an automatic retouch for smoothing contour lines of output image of the characters or other binary figures included in an original picture, on the other hand.

According to the invention, each image signal representing fine pictorial elements of a character is written on a plurality of addresses in a memory device while uneven address arrangements for each contour line are complemented with additional addresses. Thus, smooth enlarged images of the characters are electronically made up in duplicates of the original picture whereby the large capacity of the memory as well as the intricacy of the operation are advantageously excluded. In other words, the resolving power of the system is remarkably improved by means of the electronic circuits included therein.

Other objects and merits of the invention will be made clear hereinafter.

DETAILED DESCRIPTION OF THE PREFERRED EMBODIMENTS

Figure 1:
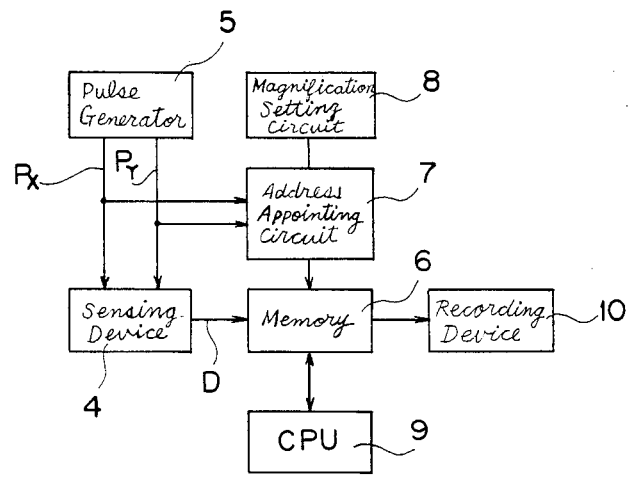
FIG. 1 is block diagram showing an apparatus used in the invention.

Referring to FIG. 1, an image sensing device comprises a sensor such as a television (TV) camera, a recording bulb or a solid element, for instance a charge coupled device (CCD). Image signals that are photoelectrically converted into electric signals by the sensing device 4 are then sampled to be charged into a memory device 6 successively in X-direction and Y-direction in accordance with sampling pulses Px and Py supplied from a pulse generator 5. Thus, these image signals respectively represent each pictorial element constituting a figure in the original picture.

The memory device 6 is of a memory capacity which is an integral multiple of the number of photoelectric convertor elements disposed on the surface of said sensing device 4. An addressing circuit 7 allocates memory addresses where the image signals D fed from the portion 4 are to be stored due to said pulses Px and Py.

Figure 2:
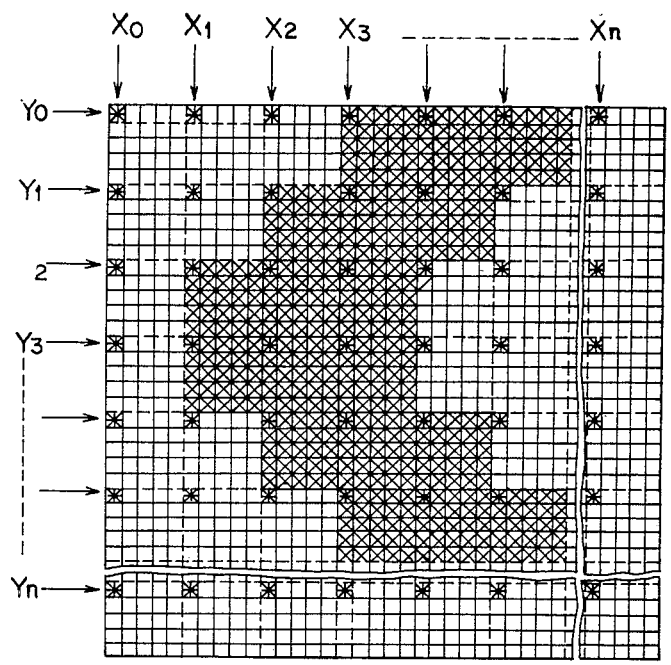
FIG. 2 exemplarily illustrates memory addresses specified for image signals.

A magnification setting circuit 8 causes the addressing circuit 7 to allocate the addresses to the signals D at intervals determined according to the preset magnification for the reproductions. For example, the intervals in both the directions X and Y will be five addresses as shown in FIG. 2 when the reproductions are to be enlarged five magnifications. The image signals D from the sensing device 4 are thus written successively one by one onto the designated addresses(Xo, Yo), (Xl, Yo) ... (Xn, Yo), (Xo, Yl), (Xl, Yl) ... (Xn, Yn). The small squares shaded with asterisks as in FIG. 2 indicate addresses on which the image signals originating from a character in an original picture scanned by the sensing device are written.

After the photoelectric scanning of the character copy has finished with said memory addresses charged with the image signals, a central processing unit (CPU) 9 will then operate so as to charge each signal on addresses enclosed with broken lines and adjacent to the appointed addresses (Xo, Yo), (Xl, Yo), etc., as marked with crosses in FIG. 2. A program for such a filling operation will be hereinafter described in detail wherein each group of the enclosed addresses will be called "magnification unit group of addresses".

Figure 3:
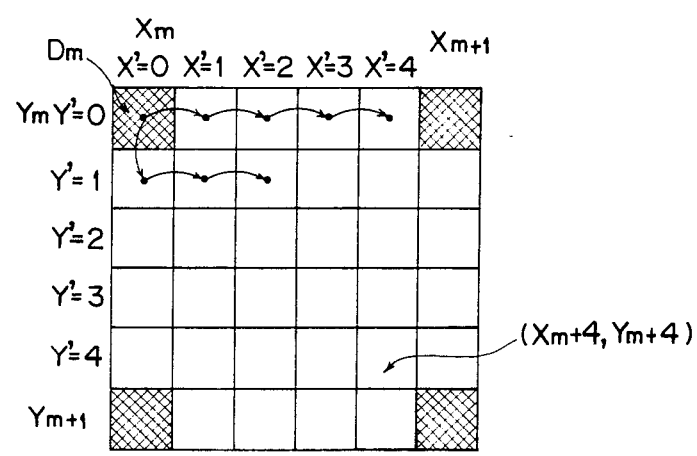
FIG. 3 is schematically showing a manner for increasing addresses that are to be specified to each image signal.
Figure 4:
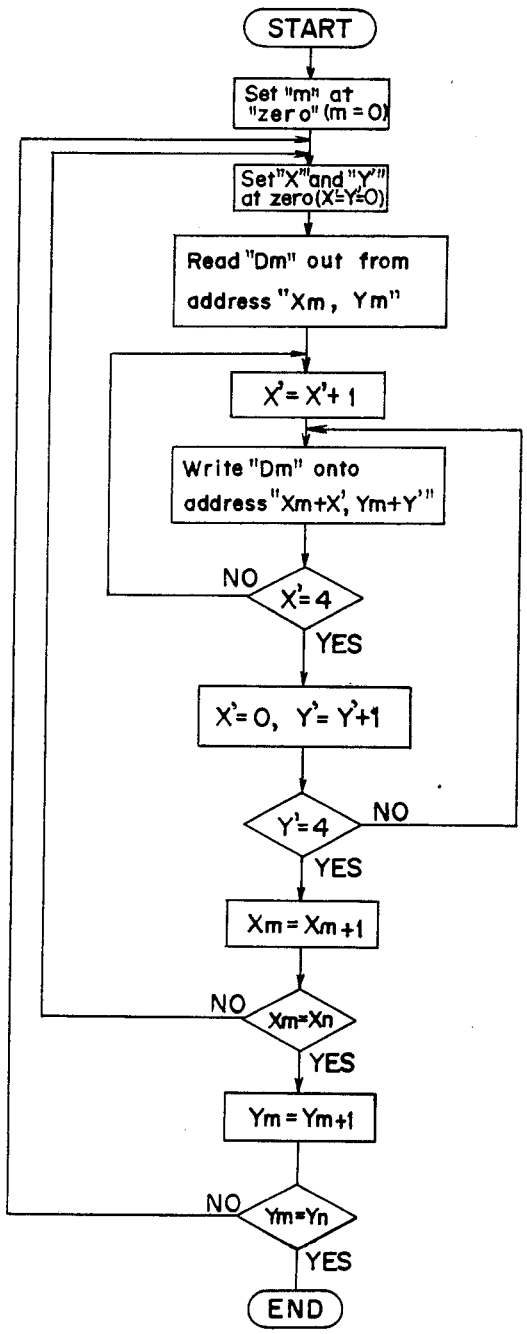
FIG. 4 is a flowchart illustrating the address increasing operation shown in FIG. 3.

A principle of the above filling operation is outlined in FIG. 3. The CPU reads the signal Dm written on the address (Xm, Ym) to thereby transfer same onto its register. Then, the CPU will advance the memory address by one step to designate the next address (Xm+1, Ym) and write there the signal Dm previously stored in the register. These steps of the operation are repeated until the signal Dm will have been written onto the address (Xm+4, Ym+4). This operation illustrated in a flowchart of FIG. 4 is carried out for all the originally designated addresses (Xo, Yo), (Xl, Yo), (X2, Yo) ... (Xn, Yn). The interval between the two adjacent addresses, e.g. (Xo, Yo) and (Xl, Yo), depends on the magnification ratio for the reproductions. After all the reproduction unit groups of addresses have received their respective image signals, the content of the memory device 6 is sent, under control by the CPU, to a recording device 10 according to reading pulses which correspond to the aforementioned sampling pulses Px, Py. Thus, the original picture is reproduced with a predetermined magnification ratio.

Besides the enlargement procedure just described above the invented method also includes another operation adapted to smooth the rugged contour lines of reproduced images, so that the apparent resolving power of the system is improved by the invention. Terraced portions of the contour lines arranged in tiers do originate from a zigzag arrangement of addresses in the memory device 6 so that small L-shaped blank areas of the addresses are filled up with the image signals belonging to adjacent protruding areas of addresses. It is noted that such a complementary operation is conducted automatically before the printing operation of the recording device.

Figure 5:
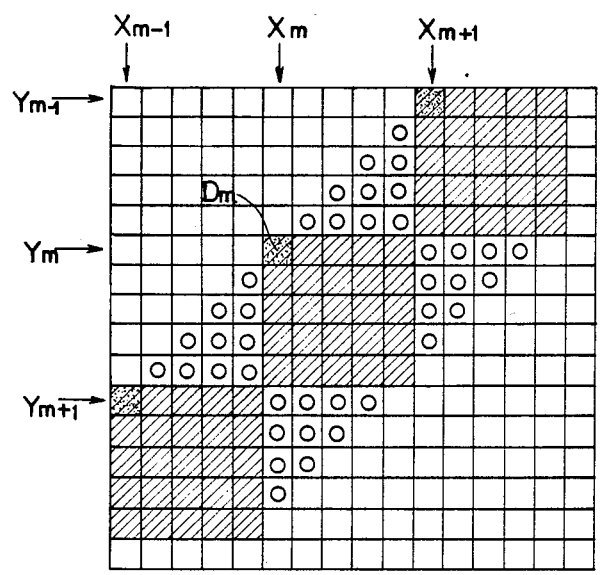
FIG. 5 and 6 schematically show a retouching manner for smoothing uneven contour lines.
Figure 6:
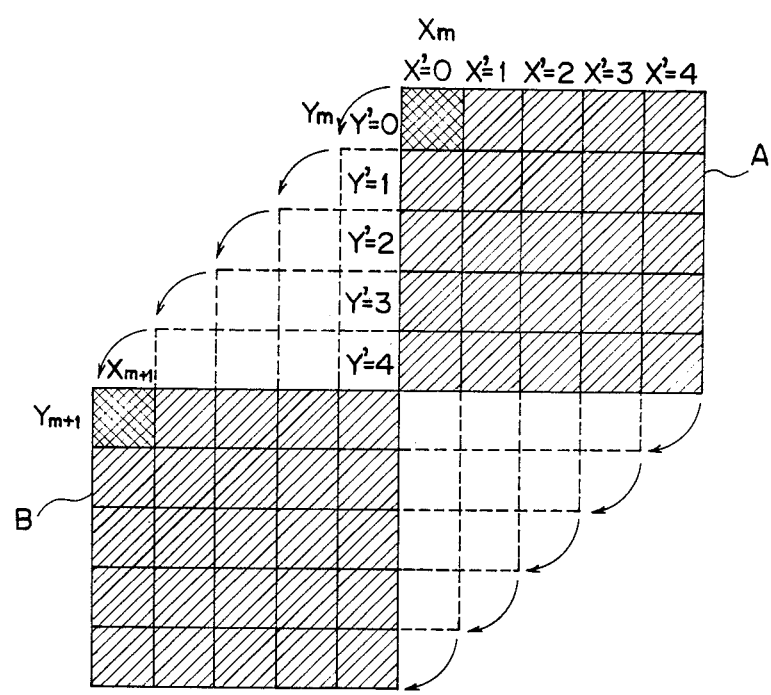

The above complementary operation will be necessary only when the contour lines extend obliquely across both the X-direction and the Y-direction as exemplified in FIG. 5. For example, the image signal Dm stored on the address (Xm, Ym) is read and transferred to the register in the CPU 9 so as to be compared with the other signals transferred thereto from the adjacent addresses (Xm−1, Ym+1), (Xm, Ym+1) and (Xm+1, Ym+1). This comparison is carried out for each address charged with the image signal between all the adjacent addresses in diagonal directions. In the case where the two diagonally adjacent addresses have the same image signal Dm, each address of the triangular blank area interposed between the two "magnification unit groups of addresses" is marked with the image signal Dm of the shaded address as indicated with circles in FIG. 5. FIG. 6 shows a model of the complementary operation in which a pattern A corresponding to the magnification unit group of addresses having the image signal Dm is successively moved step by step in a diagonal direction to the other pattern B. At each step of the movement, all the image signal Dm is given to all the addresses included in the pattern A.

Figure 7:
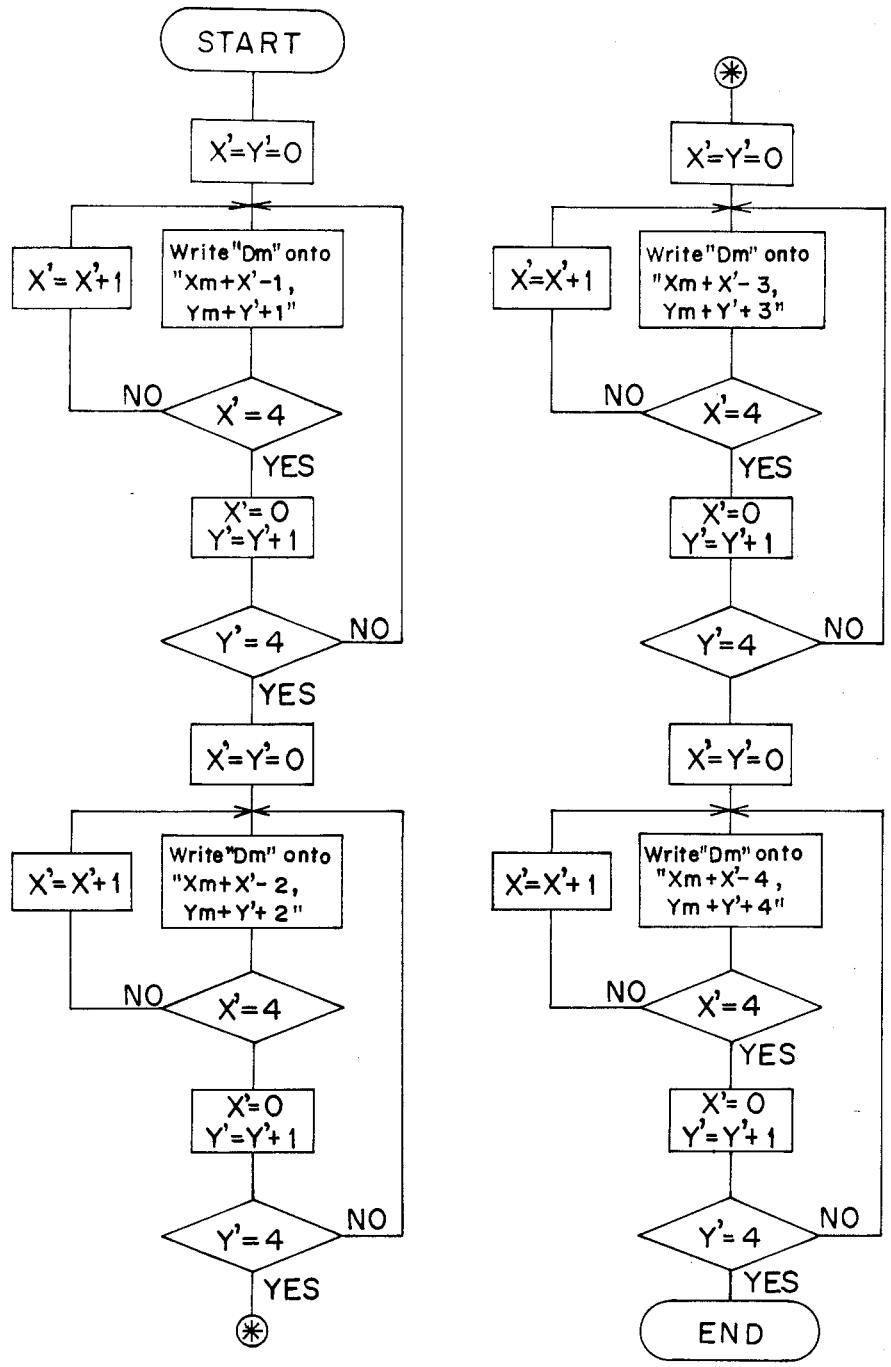
FIG. 7 is another flowchart illustrating the electronic retouching operation shown in FIGS. 5 and 6.

FIG. 7 shows a flowchart of said complementary operation that is executed by the CPU 9 by means of a preset program in a manner similar to the aforedescribed filling operation.

The next step is a transfer of the image signals filled up and complemented within the memory. They will be transferred therefrom to the recording device 10, starting from the first address (O, O) and successively thereafter. The recording device may comprise for instance a recording head of a photomechanical color scanner. The reading of the stored signals is conducted at the same timing as that of said sampling pulses to thereby produce a reproduction which is enlarged to a size of the magnification preset at the circuit 8 and which has smooth contour lines giving an appearance of improved resolving power of the system.

The foregoing example relates an embodiment applied to the enlargement of the original picture wherein the magnification ratio is an integral multiple. The invention can however be employed to a reproduction on a reduced scale in a manner as shown in the Japanese Early Publication Gazettes (Patent) Sho. 54-65601 and Sho. 54-35613 corresponding to U.S. patent application CIP Ser. No. 170,127, Great Britain Patent Application 33558/78 and German Patent Application 2836194 in the name of the applicant of the present application. These gazettes have disclosed a method in which the same memory address is repeatedly appointed to be read for enlargement of the original picture of some addresses are skipped over for the purpose of scale reduction.

The invention is also effective for duplicating graphic figures which have not a binary graduation (as in the character copy) but a continuous graduation. In this case, each address of the memory may have for instance a length of eight bits. It is also possible to form the so-called "line framed" characters which merely comprise contour lines and are used for instance as the headings in newspapers. In this connection, the images of the characters are enlarged in the memory in the aforedescribed mannar and the image signals spaced from the contour lines more than a predetermined distance are erased before they are output to the recording device.

What is claimed is:

1. A method for recording at a predetermined magnification ratio a reproduction of a figure in an original picture from image signals corresponding to pictorial elements of the figure obtained by photoelectrically scanning the picture, comprising the steps of:

writing successive image signals into a memory device at successive designated addresses, each such designated address having a magnification unit group of addresses defining a matrix of addresses associated therewith;

for each such matrix whose designated address holds a non-blank signal, writing that non-blank signal into all addresses of the matrix, thereby forming a filled matrix;

for each such matrix whose designated address holds a blank image signal and has blank addresses located diagonally between addresses of adjacent filled matrices, writing into each such blank address the non-blank image signal of one of the adjacent filled matrices, thereby smoothing rugged contour lines of the figure whose image signals are stored in the memory device; and sequentially reading image signals written into the memory device by the foregoing steps to operate a recording device, thereby recording the reproduction at the predetermined magnification ratio.

2. The method set forth in claim 1 further comprising the step of:

adjusting the magnification ratio by altering the number of addresses in each magnification unit group of addresses, thereby altering the size of each matrix.

* * * * *